US009486715B2

(12) United States Patent
Millard

(10) Patent No.: US 9,486,715 B2
(45) Date of Patent: Nov. 8, 2016

(54) PROCESS FOR PURIFYING PROCESSING FLUIDS

(75) Inventor: Michael G. Millard, Evansville, IN (US)

(73) Assignee: ORG Chem Group, LLC, Austin, TX (US)

(*) Notice: Subject to any disclaimer, the term of this patent is extended or adjusted under 35 U.S.C. 154(b) by 862 days.

(21) Appl. No.: 13/504,313

(22) PCT Filed: Nov. 2, 2010

(86) PCT No.: PCT/US2010/055132
§ 371 (c)(1),
(2), (4) Date: Jun. 13, 2012

(87) PCT Pub. No.: WO2011/053983
PCT Pub. Date: May 5, 2011

(65) Prior Publication Data
US 2012/0241309 A1    Sep. 27, 2012

Related U.S. Application Data

(60) Provisional application No. 61/257,267, filed on Nov. 2, 2009.

(51) Int. Cl.
| | | |
|---|---|---|
| *B01D 1/22* | (2006.01) | |
| *B01D 3/06* | (2006.01) | |
| *B01D 3/10* | (2006.01) | |
| *B01D 1/28* | (2006.01) | |
| B01D 53/14 | (2006.01) | |

(52) U.S. Cl.
CPC . *B01D 1/22* (2013.01); *B01D 1/28* (2013.01); *B01D 3/06* (2013.01); *B01D 3/10* (2013.01); *B01D 53/1425* (2013.01)

(58) Field of Classification Search
CPC ............ B01D 1/22; B01D 1/28; B01D 3/06; B01D 3/10; B01D 53/1425
USPC ............................................. 203/91; 159/6.2
See application file for complete search history.

(56) References Cited

U.S. PATENT DOCUMENTS

| | | | | |
|---|---|---|---|---|
| 3,878,029 A * | 4/1975 | Baird et al. | ..................... | 159/6.3 |
| 3,933,575 A * | 1/1976 | Guth et al. | ..................... | 159/49 |
| 4,014,735 A * | 3/1977 | Guth et al. | ..................... | 159/13.2 |
| 4,225,394 A * | 9/1980 | Cox et al. | ..................... | 203/37 |
| 4,273,644 A * | 6/1981 | Harris et al. | ..................... | 208/321 |
| 4,450,047 A * | 5/1984 | Malzahn | ..................... | 203/15 |
| 4,472,246 A * | 9/1984 | Stamerjohn et al. | ..................... | 203/37 |
| 4,508,597 A * | 4/1985 | Roach | ..................... | 203/79 |

(Continued)

FOREIGN PATENT DOCUMENTS

| | | |
|---|---|---|
| GB | 2252555 | 8/1992 |
| WO | WO00/76624 | 12/2000 |

*Primary Examiner* — In Suk Bullock
*Assistant Examiner* — Jonathan Miller
(74) *Attorney, Agent, or Firm* — Bushman Werner, P.C.

(57) ABSTRACT

A closed loop process for recovering purified processing fluid from contaminated processing fluid. The contaminated processing fluid is subjected to a first separation step, and there is recovered a first stream comprising the bulk of the processing fluid substantially free of contaminants, and a second stream containing processing fluid with concentrated levels of contaminants. The second stream is subjected to a second separation zone to produce a third stream comprising purified processing fluid and a fourth stream comprising contaminants.

8 Claims, 1 Drawing Sheet

(56) References Cited

U.S. PATENT DOCUMENTS

| | | | |
|---|---|---|---|
| 4,543,163 A * | 9/1985 | Stamerjohn et al. | 203/37 |
| 4,808,344 A * | 2/1989 | Hallenburg et al. | 562/105 |
| 5,108,551 A * | 4/1992 | Yan | 203/6 |
| 5,389,208 A * | 2/1995 | Beasley et al. | 203/11 |
| 5,993,608 A * | 11/1999 | Abry et al. | 203/11 |
| 6,152,994 A * | 11/2000 | Van Grinsven et al. | 95/179 |
| 6,326,461 B1 * | 12/2001 | Giroux et al. | 530/200 |
| 6,336,997 B1 * | 1/2002 | Inaba et al. | 203/1 |
| 6,465,665 B1 * | 10/2002 | Schersl | 552/545 |
| 6,508,916 B1 * | 1/2003 | Razzaghi et al. | 203/11 |
| 7,211,193 B2 * | 5/2007 | Inada et al. | 210/634 |
| 2003/0017426 A1 | 1/2003 | Boldea et al. | |
| 2004/0222077 A1 * | 11/2004 | Yada et al. | 203/1 |
| 2005/0263385 A1 * | 12/2005 | Steffens et al. | 203/14 |

* cited by examiner

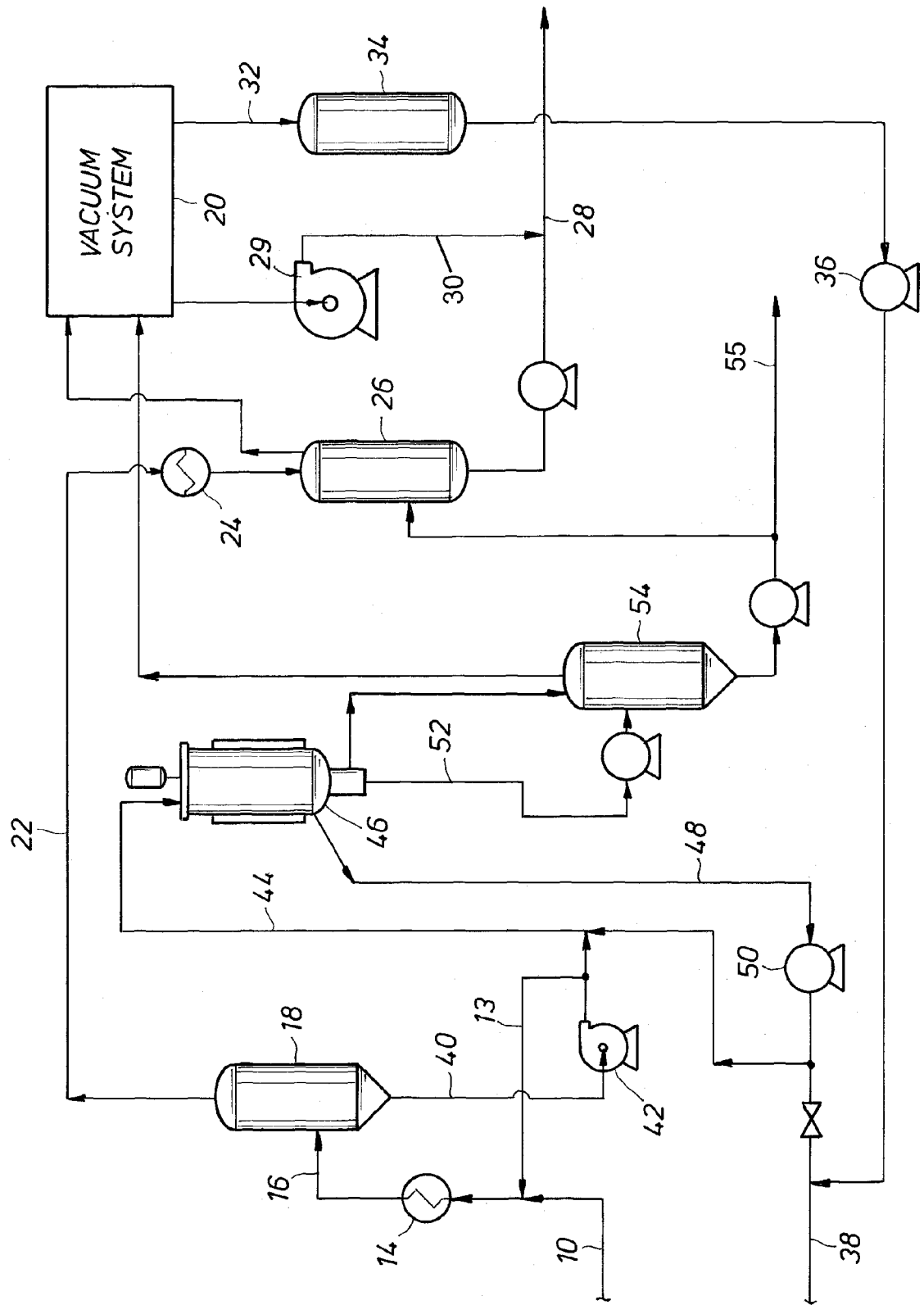

PROCESS FOR PURIFYING PROCESSING FLUIDS

BACKGROUND OF THE INVENTION

1. Field of the Invention

The present invention relates to purifying processing fluids; e.g., solvents, chemicals, etc., used in various refinery and petrochemical operations. More particularly, the present invention relates to a process to maximize the recovery of a desired processing fluid from a mixture/solution of a processing fluid and contaminants.

2. Description of Prior Art

In refining, petrochemical and other industrial applications, processing fluids are used to perform certain functions; e.g., remove acidic components from gas streams, as solvents in extractive distillation processes, etc. In addition, heavy components (contaminants) become entrained in the processing fluid. In most cases, these processing liquids are expensive and/or pose environmental disposal hazards and accordingly, must be purified or reclaimed for further use. In addition to the use of processing fluids in refinery/petrochemical operations, processing fluids can be used in other environments; e.g., the well known use of glycols to prevent gas hydrate formation in offshore oil and gas operations.

Typically, in purifying/reclaiming the processing fluids, by whatever method, there is a waste stream which contains entrained impurities which have been removed during the purifying/reclaiming process. As noted, many of these processing fluids are quite expensive and the goal of any purifying/reclaiming process is to ensure that, to the extent possible, all of the processing fluid has been recovered; i.e., there is essentially no or a de minimus amount present in the waste stream from the purifying/reclaiming process.

SUMMARY OF THE INVENTION

In one aspect, the present invention provides a closed loop process or method for removing contaminants from a used processing fluid, so that the processing fluid can be recycled for further usage.

In another aspect, the present invention provides a two-step method to maximize recovery of a processing fluid from a processing fluid/contaminant mixture or solution. In the first step, the processing fluid/contaminant mixture is subjected to a first separation zone, generally a vacuum flash to provide a first stream comprising the bulk of the processing fluid freed of contaminants; and a second stream containing the remainder of the processing fluid and contaminants. In the second step of the process, the second stream is subjected to a second separation zone, preferably in a wiped film evaporator, to produce a third stream comprising purified processing fluid and a fourth stream comprising waste products/contaminants from the processing fluid/contaminant mixture.

BRIEF DESCRIPTION OF THE DRAWING

The single FIGURE is a schematic flow sheet showing one embodiment of the present invention.

DESCRIPTION OF PREFERRED EMBODIMENTS

While the present invention will be described with respect to the recovery of amines such as diethanol amines used to scrub gas streams to natural gas, to absorb components such as sulphur containing and other gases, it will be understood, as noted above, that it is not so limited. Accordingly, the process of the present invention can be used to reclaim and/or purify any number of processing liquids used in any number of processes.

As noted above, in addition to the absorbed components; e.g., the acidic gases, the processing fluid becomes entrained with heavy, generally non-absorbed components which, over time deleteriously affects the efficacy of the processing fluid, causes damage to equipment, etc. One of the goals of the present invention is to separate the generally non-absorbed, heavy components, hereafter referred to as contaminants, impurities or waste products from the processing fluid.

Referring then to the single FIGURE, a contaminated stream of an alkanol amine (processing fluid) and impurities which has been adjusted to a pH of from about 8 to 11 is fed via line 10 where it is mixed with a stream from line 13, described more fully hereafter. The combined streams pass through and are heated in a steam heat exchanger 14, the temperature being raised to about 250-350° F., and introduced via line 16 to a flash vessel 18. It will be understood that flash vessel 18 can take many different forms, and is typically operated under vacuum, in this case provided by a vacuum system shown schematically as 20.

As noted, the feed stream 10 is mixed with a stream from line 13, the stream in line 13 being excess liquid from flash vessel 18, which requires reboil. The remaining portion of the feed to vessel 18 is pumped via pump 42 and line 44 to a distillation zone; e.g., an evaporator, particularly a wiped film evaporator 46, to distill the processing fluid and separate it from various, low vapour pressure impurities/contaminants. As noted, excess liquid and low vapour pressure impurities not sent via line 44 to evaporator 46 are recirculated as reboil to flash vessel 18. The flash loop allows for steady and consistent feed rate to evaporator 46 which, as is known to one skilled in the art, is essential to its operation. A back pressure device (not shown) is in line 16 just prior to the stream passing through line 16 entering flash vessel 18 to eliminate any two phase flow in the circulation of the excess liquid from flash vessel 18.

The high vapour pressure components that boil at preset operating temperatures and pressures in flash vessel 18 form vapours that are drawn by a vacuum system 20 via line 22 through condenser 24 to form a liquid which accumulates in receiving vessel 26.

A slip stream, which constitutes typically 10 to 30%; e.g., 20%, of the total feed stream introduced into flash vessel 18, as noted, is introduced into evaporator 46 via line 40, pump 42, and line 44. Distillate from evaporator 46 is removed via line 52 and collects in receiving vessel 54. Alternatively, the distillate from evaporator 46, as shown, can be discharged as a product stream via line 55 or sent to receiving vessel 26, wherein it is mixed with liquid product initially flashed from flash vessel 18.

In the case of alkanol amines, the operating conditions in flash vessel 18 versus the operating condition in wiped film evaporator 46 are such that the temperature conditions in evaporator 46 are generally in the range of from 300° to 400° F. and under a vacuum of less than about 25 mm Hg preferably less than 10 mm. Hg, in order to effect proper distillations, whereas in the case of flash vessel 18, the temperature can range from about 250° to 350° F., and the pressure from about 30 to 500 mm Hg.

The impurities or waste from evaporator 46 are removed via line 48 and pump 50, and discharged as waste through line 38. Typically, the amount of impurities in the contaminated feed stream; i.e., the stream in line 10, are relatively small and accordingly, recycling of separated impurities back to evaporator 46 can be used.

As noted, purified processing fluid is collected in receiving vessel 26, both from initial flash from flash vessel 18 and the distillate from evaporator 46 and constitutes the final product which is removed via line 28.

Vacuum system 20, as noted above, provides reduced pressure (30 to 500 mm Hg) in the flash vessel 18, and a deeper vacuum (less than 25 mm Hg, preferably less than 10 mm. Hg) in evaporator 46.

Any low boiling, high vapour pressure components that are not condensed elsewhere in the system are drawn in to vacuum system 20 and exit as a recovered component. Generally, these low boiling, high vapour pressure components are sulphur-containing gases or similar materials, which the processing fluid is designed to absorb. Thus, they are not a contaminant or waste product as are the heavier components that become entrained in the processing fluid. Accordingly, they, together with the processing fluid free of the entrained heavier components, can be further used. The recovered components are compressed in compression station 29 and are introduced into the final product stream 28 via line 30. This final step allows recovery of all components, other than the undesirable impurities and waste from the alkanol amine. This novel approach makes the process a closed loop system (only rejecting the components considered as waste) and produces no waste vapour (emissions) stream. Water condensate from vacuum system 20 is directed to a receiving vessel 34 via line 32 and, as shown, can be recycled via pump 36 into line 38 to dilute and allow better flow of the concentrated impurities (waste) from evaporator 46.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described are exemplary, and various other substitutions, alterations and modifications, including but not limited to those design alternatives specifically discussed herein, may be made in the practice of the invention without departing from its scope.

What is claimed is:

1. A process for purifying a processing fluid comprising:
   providing a feed stream having a pH of from about 8 to about 11 comprising used processing fluid, low boiling components, and contaminants, said used processing fluid comprising at least one alkanol amine;
   introducing said feed stream into a first separation zone comprising a vacuum flashing vessel wherein said feed stream is at least partially vapourized to produce a first vapour stream comprising substantially contaminant-free processing fluid and low boiling components, and a second stream comprising processing fluid and contaminants; and
   returning a first portion of said second stream to said first separation zone;
   introducing a second portion of said second stream to a second separation zone wherein said second portion of said second stream is at least partially vapourized to produce a third stream comprising substantially contaminant-free processing fluid and a fourth stream comprising contaminants removed from said feed stream, wherein said second portion of said second stream is about 10-30% by volume of the feed stream introduced into the first separation zone.

2. The process of claim 1, wherein said second separation zone comprises wiped film evaporation.

3. The process of claim 1, wherein the temperature in said first separation zone is from about 250° to 350° F.

4. This process of claim 1, wherein the pressure in said first separation zone is from about 30 to about 500 mm Hg.

5. The process of claim 1, wherein the temperature in said second separation zone is from about 300° to about 400° F.

6. The process of claim 1, wherein the pressure in said second separation zone is less than about 25 mm Hg.

7. The process of claim 1, wherein low boiling components present in the first vapour stream are compressed and recovered.

8. A process for purifying a processing fluid comprising:
   providing a feed stream comprising used processing fluid, low boiling components, and contaminants, said processing fluid comprising at least one alkanol amine;
   introducing said feed stream into a first separation zone comprising a vacuum flashing vessel wherein said feed stream is at least partially vapourized to produce a first vapour stream comprising substantially contaminant-free processing fluid and low boiling components, and a second stream comprising processing fluid and contaminants; and
   returning a first portion of said second stream to said first separation zone;
   introducing a second portion of said second stream to a second separation zone wherein said second portion of said second stream is at least partially vapourized to produce a third stream comprising substantially contaminant-free processing fluid and a fourth stream comprising contaminants removed from said feed stream, wherein said second portion of said second stream is about 10-30% by volume of the feed stream introduced into the first separation zone.

* * * * *